(12) United States Patent
Shin et al.

(10) Patent No.: US 12,456,776 B2
(45) Date of Patent: Oct. 28, 2025

(54) BATTERY MOUNTING STRUCTURE FOR VEHICLE

(71) Applicants: Hyundai Motor Company, Seoul (KR); Kia Corporation, Seoul (KR)

(72) Inventors: Gyung Hoon Shin, Seoul (KR); Hyeon Su Jin, Bucheon-Si (KR); Gun Woo Ko, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 637 days.

(21) Appl. No.: 17/891,600

(22) Filed: Aug. 19, 2022

(65) Prior Publication Data

US 2023/0238634 A1 Jul. 27, 2023

(30) Foreign Application Priority Data

Jan. 27, 2022 (KR) .................. 10-2022-0012491

(51) Int. Cl.
*H01M 50/244* (2021.01)
*H01M 50/249* (2021.01)
*H01M 50/262* (2021.01)
H01M 50/204 (2021.01)

(52) U.S. Cl.
CPC ....... *H01M 50/244* (2021.01); *H01M 50/249* (2021.01); *H01M 50/262* (2021.01); *H01M 50/204* (2021.01); *H01M 2220/20* (2013.01)

(58) Field of Classification Search
CPC ............. H01M 50/244; H01M 50/249; H01M 50/262; H01M 50/204; H01M 2220/20; H01M 50/20; B60L 50/64; B60L 53/80
See application file for complete search history.

(56) References Cited

U.S. PATENT DOCUMENTS

| | | | |
|---|---|---|---|
| 2003/0214085 A1* | 11/2003 | Makino | B60K 5/1233 267/140.12 |
| 2009/0152034 A1 | 6/2009 | Takasaki et al. | |
| 2018/0194212 A1 | 7/2018 | Hamilton et al. | |
| 2018/0201110 A1* | 7/2018 | Yin | F16B 35/045 |
| 2019/0337471 A1 | 11/2019 | Brehm | |
| 2020/0009957 A1 | 1/2020 | Grosse et al. | |
| 2020/0259142 A1 | 8/2020 | Yin et al. | |
| 2020/0321572 A1 | 10/2020 | Bengtsson et al. | |
| 2021/0184194 A1 | 6/2021 | Lim et al. | |
| 2022/0194197 A1* | 6/2022 | Park | H01M 50/249 |

FOREIGN PATENT DOCUMENTS

| | | |
|---|---|---|
| KR | 10-2012-0060022 | 6/2012 |
| KR | 10-2021-0001334 | 1/2021 |
| KR | 10-2023-0118742 | 8/2023 |

* cited by examiner

*Primary Examiner* — Jacob R Crum
(74) *Attorney, Agent, or Firm* — Morgan Lewis & Bockius LLP (57) ABSTRACT

A battery mounting structure for a vehicle, includes: a mounting bush provided to penetrate a portion of a battery case and including a fastening screw formed on an upper inner circumferential surface of the mounting bush; a hollow bolt coupled to the battery case and the fastening screw from above the battery case; a fastening bolt provided to penetrate inside of the mounting bush and inside of the hollow bolt up and down; and a sleeve assembly provided to guide the fastening bolt and elastically restricting separation of the fastening bolt from the mounting bush.

17 Claims, 5 Drawing Sheets

BATTERY MOUNTING STRUCTURE FOR VEHICLE

CROSS REFERENCE TO RELATED APPLICATION

The present application claims priority to Korean Patent Application No. 10-2022-0012491, filed Jan. 27, 2022, the entire contents of which is incorporated herein for all purposes by this reference.

BACKGROUND OF THE PRESENT DISCLOSURE

Field of the Present Disclosure

The present disclosure relates to a battery mounting structure for a vehicle.

Description of Related Art

An electric vehicle, a hybrid vehicle, or the like is mounted with a high voltage battery (hereinafter, referred to as a "battery"), and the battery is often mounted to a lower side of a vehicle body.

The electric vehicle has a disadvantage in that its charging time is relatively longer than the time taken to put gas in a general vehicle using an internal combustion engine. To overcome the present disadvantage, there has been being searched for a way to separate and replace the battery in the vehicle body.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery mounting structure for a vehicle, in which a fastening bolt for mounting a battery to a lower side of a vehicle body is maintained as coupled to the battery even when the battery is separated from the vehicle body, so that there are no needs to handle the fastening bolts separately from the battery when the battery is repeatedly mounted to and removed from the vehicle body; the fastening bolts are reusable; the assembly tolerance is readily absorbed when the battery is mounted to the vehicle body; and the fastening angle of the fastening bolt is appropriately guided to prevent error in fastening, securing high assembly and disassembly workability, and allowing the fastening bolt to be replaceable when the fastening bolt is damaged.

According to an exemplary embodiment of the present disclosure, a battery mounting structure for a vehicle includes: a mounting bush provided to penetrate a portion of a battery case and including a fastening screw formed on an upper inner circumferential surface of the mounting bush; a hollow bolt coupled to the battery case and the fastening screw from above the battery case; a fastening bolt provided to penetrate inside of the mounting bush and inside of the hollow bolt up and down; and a sleeve assembly provided inside the mounting bush and configured to guide the fastening bolt and elastically restrict separation of the fastening bolt from the mounting bush.

The sleeve assembly may be provided to elastically support the fastening bolt on the mounting bush while allowing the fastening bolt to be movable inside the mounting bush.

The sleeve assembly may include: a coupling guide held in the mounting bush;
a sleeve surrounding the fastening bolt and guiding the fastening bolt within the coupling guide; and
a guide spring elastically mounted between the coupling guide and the sleeve.

The coupling guide may be detachably mounted by an elastic transformation of the mounting bush.

The mounting bush may be internally formed with a cylindrical space; a coupling groove may be formed on an internal circumferential surface of the mounting bush to hold the coupling guide below the fastening screw; and a coupling protrusion may be provided in the coupling guide and elastically inserted into the coupling groove.

The sleeve may include a plurality of holding protrusions to elastically press and support an external circumferential surface of the fastening bolt.

The sleeve may be cylindrically formed to surround the fastening bolt; and the holding protrusions may be provided in a plurality of elastic supporters protruding toward the fastening bolt from the sleeve.

The guide spring may include a plurality of leaf springs connecting the coupling guide and the sleeve; and a surface of the leaf spring may be provided to be parallel with a longitudinal direction of the sleeve.

The guide spring may include a plurality of leaf springs provided between the coupling guide and the sleeve and forming a swirl shape around the sleeve.

The mounting bush may be provided between an upper side of a mounting cup fastened to a lower case of the battery case and a lower side of an upper case of the battery case; and the hollow bolt may be coupled to the fastening screw of the mounting bush with the upper case therebetween.

The mounting cup may include a recessed portion formed upwards from a lower side of the lower case to accommodate a head portion of the fastening bolt in the recessed portion; and the mounting bush may be provided on an upper side of the recessed portion.

Furthermore, according to an exemplary embodiment of the present disclosure, a battery mounting method of a vehicle may include: inserting and fastening a sleeve assembly in and to an internal side of a mounting bush coupled to a battery case; fastening a hollow bolt to an upper side of the mounting bush with an upper case of the battery case compressed and held between the hollow bolt and the mounting bush; and fastening a fastening bolt penetrating the mounting bush to a coupling nut of a vehicle body positioned above a battery.

When the battery is separated from the vehicle body, the fastening bolt may be rotated and separated from the coupling nut so that the fastening bolt may be maintained as elastically supported on the sleeve assembly, and when the battery is coupled to the vehicle body again, the fastening bolt maintained by a sleeve not to separate may be directly coupled to the coupling nut of the vehicle body.

According to the present disclosure, a fastening bolt for mounting a battery to a lower side of a vehicle body is maintained as coupled to the battery even when the battery is separated from the vehicle body. Therefore, there is no need to handle the fastening bolts separately from the battery when the battery is repeatedly mounted to and removed from the vehicle body; the fastening bolts are reusable; the assembly tolerance is easily absorbed when the battery is mounted to the vehicle body; and the fastening angle of the fastening bolt is appropriately guided to prevent mis-fastening, securing high assembly and disassembly workability, and allowing the fastening bolt to be replaceable when the fastening bolt is damaged.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Regarding embodiments of the present disclosure included in the present specification or application, the specific structural or functional description is merely illustrative for describing the embodiments of the present disclosure, and embodiments of the present disclosure may be implemented in various forms but not be construed as being limited to the embodiments set forth in the present specification or application.

Because the embodiments of the present disclosure may be variously modified and have various forms, specific exemplary embodiments will be illustrated in the drawings and described in detail in the present specification or application. However, it should be understood that embodiments of the present disclosure are intended not to be limited to the specific embodiments but to cover all modifications, equivalents or alternatives without departing from the spirit and technical scope of the present disclosure.

Terms such as "first" and/or "second" are used herein merely to describe a variety of elements, but the elements are not limited by these terms. Such terms are used only for distinguishing one element from another element. For example, without departing from the conceptual scope of the present disclosure, a first element may be referred to as a second, and vice versa.

When a certain element is referred to as being "connected to" or "coupled to" another element, it will be understood that they may be directly connected to or coupled to each other but or intervening elements may be present therebetween. On the other hand, when a certain element is referred to as being "directly connected to" or "directly coupled to" another element, it will be understood that no intervening elements are present therebetween. Other expressions describing relationships between elements, such as "between," "immediately between," "adjacent to," "directly adjacent to," or etc. may also be construed in the same manner.

Terms used in the present specification are merely used for explaining specific embodiments, but not intended to limit the present disclosure. Unless the context clearly dictates otherwise, singular forms include plural forms as well. It is to be understood that terms "include," "have," etc. As used herein specify the presence of stated features, integers, steps, operations, elements, components, or combination thereof, but do not preclude the presence or addition of one or more other features, integers, steps, operations, elements, components or combination thereof.

Unless defined otherwise, all terms used herein including technical or scientific terms have the same meanings as those generally understood by a person having ordinary knowledge in the art to which the present disclosure pertains. The terms such as those defined in generally used dictionaries are construed to have meanings matching that in the context of related technology, and unless clearly defined otherwise, are not construed to be ideally or excessively formal.

Below, the present disclosure will be described in detail by describing embodiments with reference to the accompanying drawings. Like reference numerals in the drawings refer to like numerals.

Referring to FIGS. 1 to 6, a battery mounting structure for a vehicle according to an exemplary embodiment of the present disclosure includes a mounting bush 7 provided to penetrate a battery case 3 of a battery 1 and provided with a fastening screw 5 on an upper circumferential surface thereof; a hollow bolt 9 coupled to the fastening screw 5 from above the battery case 3; a fastening bolt 11 provided to penetrate the inside of the mounting bush 7 and the inside of the hollow bolt 9 up and down; and a sleeve assembly 13 provided to elastically support the fastening bolt 11 with respect to the mounting bush 7 to allow the fastening bolt 11 to move inside the mounting bush 7, while guiding the fastening bolt 11 and elastically restricting separation of the fastening bolt 11 from the mounting bush 7.

Figure 1:
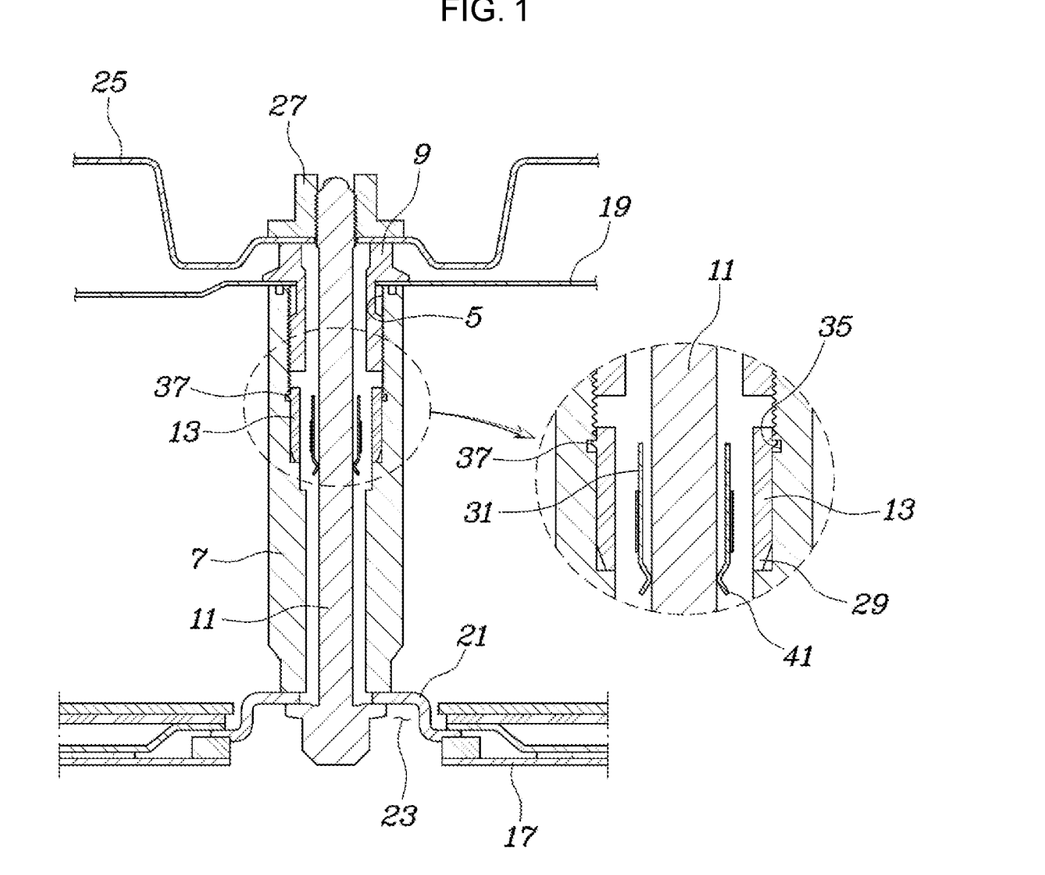
FIG. 1 is a view showing a battery mounting structure for a vehicle according to the present disclosure.

In other words, according to the present disclosure, the sleeve assembly 13 elastically supports the fastening bolt 11, so that the fastening bolt 11 may be maintained as coupled to the battery 1 even when the fastening bolt 11 is not fastened to the vehicle body, and assembly tolerance may be easily absorbed and a fastening angle may be appropriately guided to prevent mis-fastening when the fastening bolt 11 is fastened to the vehicle body.

The fastening bolt 11 may be repeatedly used when the battery 1 is repeatedly coupled to and separated from the vehicle body. Furthermore, the fastening bolt 11 is not completely separated from the battery 1, and therefore there is no need to individually handle a plurality of fastening bolts 11, securing high assembly and disassembly workability.

Furthermore, when the fastening bolt 11 needs to be replaced for damage to its screw thread or the like, it is easy to replace the fastening bolt 11 because the sleeve assembly 13 elastically supports the fastening bolt 11.

Figure 2:
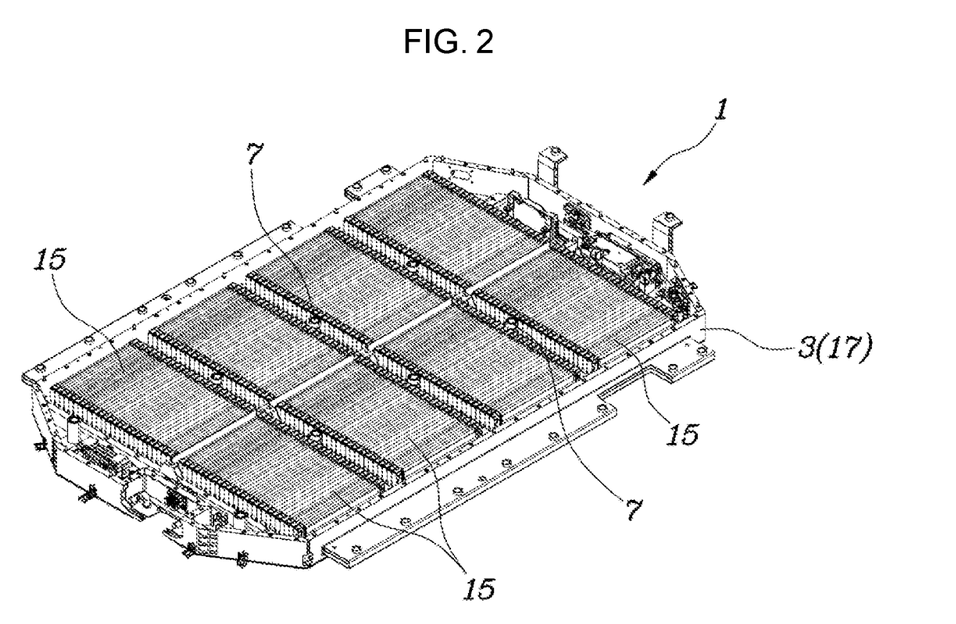
FIG. 2 is a view exemplarily illustrating a structure of a battery according to the present disclosure.

FIG. 2 shows the structure of the battery 1 according to the present disclosure, in which a plurality of battery modules 15 is accommodated in a lower case 17 of the battery case 3, and the mounting bushes 7 are provided between the battery modules 15.

Of course, an upper case 19 is coupled to an upper side of the lower case 17 thereby forming the battery case 3. As described above, the hollow bolt 9 is provided to penetrate the upper case 19 from above and is then fastened to the fastening screw 5 of the mounting bush 7.

In other words, the mounting bush 7 is provided between an upper side of a mounting cup 21 fastened to the lower case 17 of the battery case 3 and a lower side of the upper case 19 of the battery case 3; and the hollow bolt 9 is coupled to the fastening screw 5 of the mounting bush 7 with the upper case 19 therebetween.

The mounting cup 21 includes a recessed portion 23 formed upwards from the lower side of the lower case 17 to accommodate a head portion of the fastening bolt 11; and the mounting bush 7 is provided on the upper side of the recessed portion 23.

The fastening bolt 11 is coupled to a coupling nut 27 provided in a vehicle body 25 while penetrating the mounting bush 7 and the hollow bolt 9 from below the battery, fastening the battery to the vehicle body 25.

For reference, the coupling nut 27 may be provided on a floor panel, a cross member, a mounting bracket, etc., of the vehicle body 25.

Figure 4:
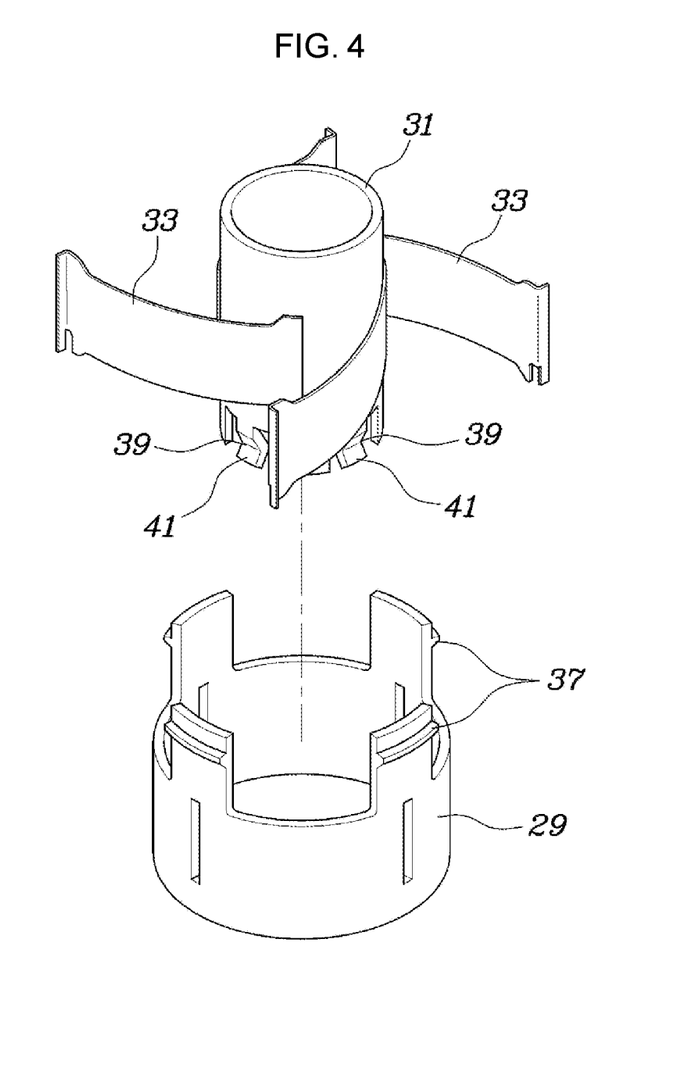
FIG. 4 is an exploded perspective view of a sleeve assembly.
Figure 5:
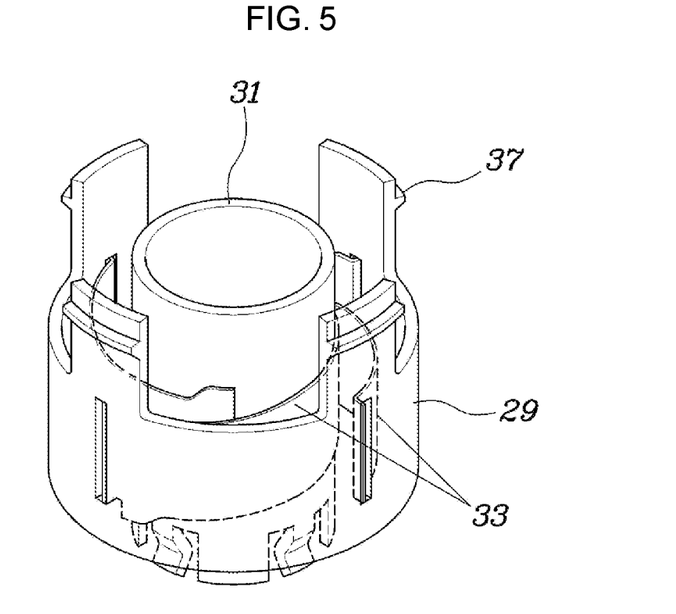
FIG. 5 is an assembled perspective view of the sleeve assembly.

The sleeve assembly 13 includes a coupling guide 29 held in the mounting bush 7; a sleeve 31 surrounding and guiding the fastening bolt 11 within the coupling guide 29; and a guide spring 33 to support the sleeve 31 on the coupling guide 29 elastically.

In other words, the sleeve assembly 13 allows the fastening bolt 11 to be elastically supported on the mounting bush 7 by coupling the coupling guide 29 to the mounting bush 7, inserting the fastening bolt 11 in the sleeve 31, and using the guide spring 33 to elastically support the sleeve 31 on the coupling guide 29.

The coupling guide 29 is detachably mounted to the mounting bush 7 by elastic transformation.

The mounting bush 7 is internally formed with a cylindrical space; a coupling groove 35 is formed on the internal circumferential surface of the mounting bush 7 to hold the coupling guide 29 below the fastening screw 5; and a coupling protrusion 37 is provided in the coupling guide 29 and elastically inserted in the coupling groove 35.

Therefore, when the sleeve assembly 13 is damaged, the replacement of the sleeve assembly 13 is easily conducted by removing the sleeve assembly 13 from the mounting bush 7 while elastically transforming the coupling protrusion 37.

The sleeve 31 includes a plurality of holding protrusions 39 to elastically press and support the external circumferential surface of the fastening bolt 11.

In other words, the holding protrusion 39 makes the fastening bolt 11 be maintained as coupled to the battery 1 even when the fastening bolt 11 is not coupled to the vehicle body 25.

In the present exemplary embodiment of the present disclosure, the sleeve 31 is cylindrically formed to surround the fastening bolt 11 and easily guide the fastening bolt 11, and the holding protrusions 39 are provided in a plurality of elastic supporters 41 protruding downwards from the sleeve 31.

In other words, the elastic supporter 41 and the lower side of the cylindrical sleeve 31 are formed as a single body, and the elastic supporter 41 is bent to form the holding protrusion 39 as shown in the drawings. Thus, the elastic supporter 41 and the holding protrusion 39 may be formed integrally with the sleeve 31.

Figure 3:
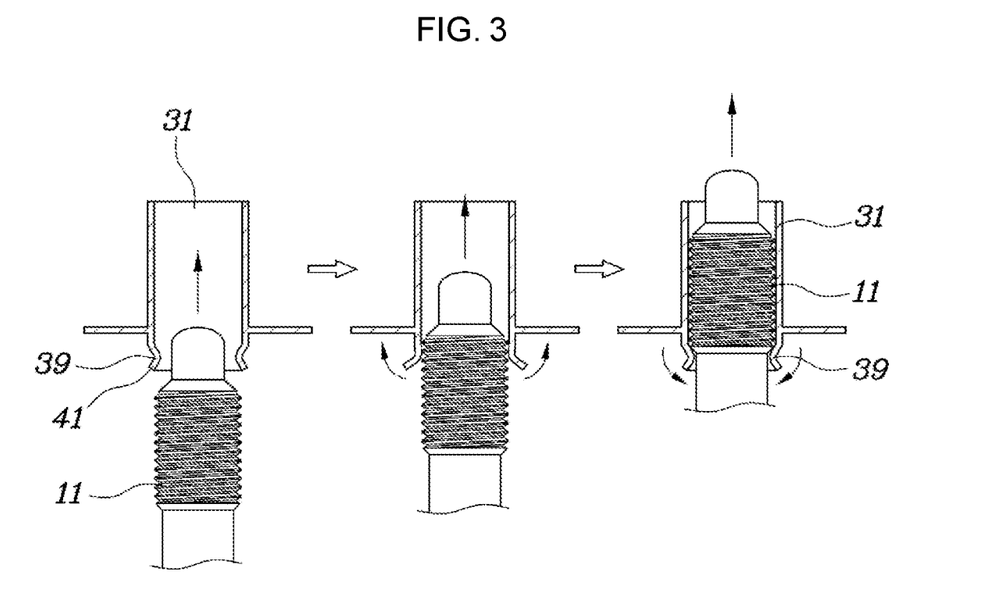
FIG. 3 is a view exemplarily illustrating a process of coupling a fastening bolt to a sleeve.

FIG. 3 shows a process of mounting the fastening bolt 11 to the sleeve 31, in which, when the fastening bolt 11 is pushed into the sleeve 31 from below the sleeve 31, the elastic supporter 41 is elastically transformed outwards allowing the fastening bolt 11 to be inserted in the sleeve 31, and the holding protrusion 39 of the elastic supporter 41 supports the external circumferential surface of the fastening bolt 11, elastically supporting and preventing the fastening bolt 11 from separating from the sleeve 31.

In the last state of FIG. 3, the screw thread portion of the fastening bolt 11 entirely passes through the holding protrusions 39, is positioned above the holding protrusions 39, and supported by the holding protrusions 39, so that the present state may be stably maintained even when the fastening bolt 11 is not coupled to the vehicle body 25. When the fastening bolt 11 is fastened to the vehicle body 25, the screw thread portion of the fastening bolt 11 does not pass through the holding protrusions 39 again, is guided by the sleeve 31 as it is, and is thus easily coupled to the vehicle body 25.

Therefore, the internal diameter portion of the sleeve 31 is large enough to guide the screw thread portion of the fastening bolt 11 to move straightly therein, so that the fastening angle of the fastening bolt 11 may be appropriately guided when the fastening bolt 11 is fastened to the vehicle body.

In the present exemplary embodiment of the present disclosure, the guide spring 33 includes a plurality of leaf springs connecting the coupling guide 29 and the sleeve 31; and the surface of the leaf spring is provided to be in parallel with the longitudinal direction of the sleeve 31.

Here, the surface of the leaf spring is construed as the largest area of the leaf spring, and the present area is provided forming a surface perpendicular to a plane perpendicular to the longitudinal direction of the sleeve 31. Thus, when the sleeve 31 moves with respect to the coupling guide 29, the guide spring 33 is transformed on the plane (i.e., the plane as shown in FIG. 6) perpendicular to the longitudinal direction of the sleeve 31 as far as possible.

Figure 6:
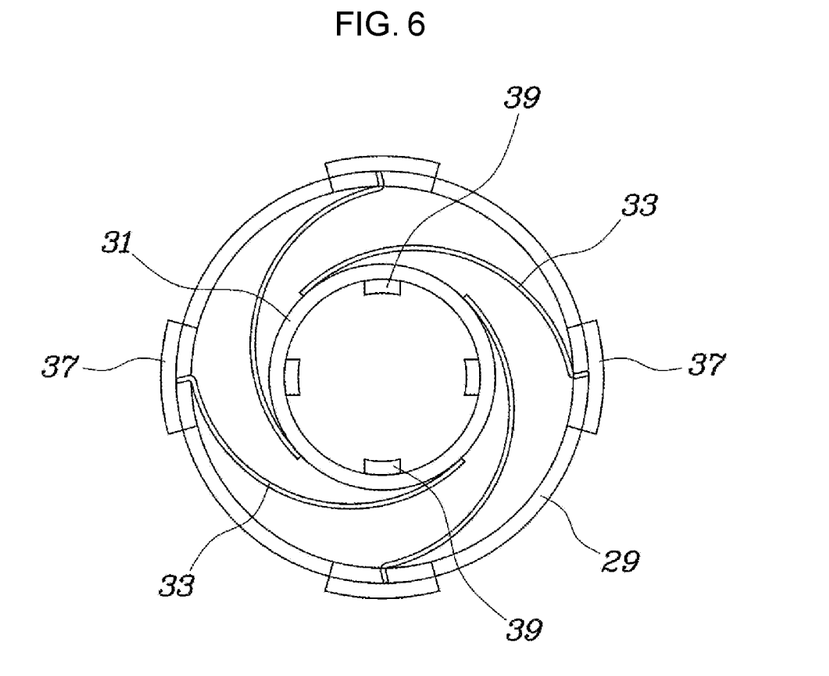
FIG. 6 is a plan view of the sleeve assembly in FIG. 5.

In other words, the guide spring 33 includes the plurality of leaf springs provided between the coupling guide 29 and the sleeve 31 and forming a swirl shape around the sleeve 31 as shown in FIG. 6, so that the sleeve 31 may be immediately restored to its original position and posture even though the sleeve 31 is moved or changed in posture within the coupling guide 29.

Therefore, the fastening bolt 11 guided by the sleeve 31 is stably maintained at a correct fastening angle.

Alternatively, the guide spring 33 may include a plurality of coil springs provided between the coupling guide 29 and the sleeve 31 instead of the foregoing leaf springs. However, in the instant case, a tendency for the sleeve 31 to be restored to its original posture may be weaker than that of the case where the guide spring 33 includes the plurality of leaf springs.

Figure 7:
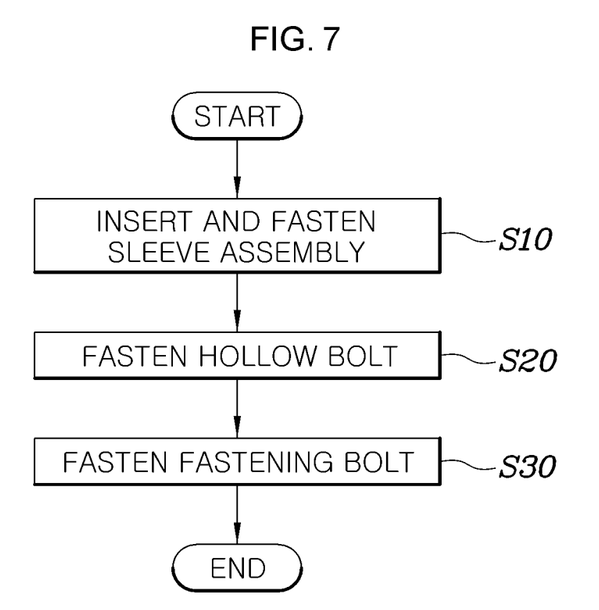
FIG. 7 is a flowchart showing a battery mounting method of a vehicle according to an exemplary embodiment of the present disclosure.

Referring to FIG. 7, a battery mounting method of a vehicle according to an exemplary embodiment of the present disclosure includes the steps of inserting and fastening the sleeve assembly 13 in and to the internal side of the mounting bush 7 coupled to the battery case 3 (S10); fastening the hollow bolt 9 to the upper side of the mounting bush 7 with the upper case 19 of the battery case 3 compressed and held between the hollow bolt 9 and the mounting bush 7 (S20); and fastening the fastening bolt 11 penetrating the mounting bush 7 to the coupling nut 27 of the vehicle body 25 positioned above the battery 1 (S30).

Here, the lower end portion of the mounting bush 7 is being fastened in advance by welding or the like to the mounting cup 21 coupled to the lower case 17 of the battery case 3, and the sleeve assembly 13 is inserted in and coupled to the internal side of the mounting bush 7 so that the coupling protrusion 37 of the coupling guide 29 may be inserted in the coupling groove 35 formed on the internal side of the mounting bush 7 before being covered with the upper case 19.

After inserting the sleeve assembly 13 in the mounting bush 7, the mounting bush 7 is covered with the upper case 19 and fastened with the hollow bolt 9 so that the upper case 19 may be compressed between the hollow bolt 9 and the mounting bush 7, and a seal or the like for airtightness may be inserted between the upper case 19 and the mounting bush 7.

Meanwhile, when the battery 1 is separated from the vehicle body 25, the fastening bolt 11 is rotated and separated from the coupling nut 27 so that the fastening bolt 11 may be maintained as elastically supported on the sleeve assembly 13.

In other words, the fastening bolt 11 is maintained not to completely separate from the battery 1.

Accordingly, when the battery 1 is coupled to the vehicle body 25 again after the charging, maintenance, etc. of the battery 1 are completed, the fastening bolt 11 maintained by the sleeve 31 not to separate is coupled to the coupling nut 27 of the vehicle body 25 as itis.

Consequently, once the fastening bolt 11 is coupled to the battery 1, the fastening bolt 11 moves integrally with the battery 1 even though the battery 1 is separated from the vehicle body 25. Therefore, there is no need to individually handle the plurality of fastening bolts 11, securing high assembly and disassembly workability when the battery 1 is assembled and disassembled.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery mounting structure for a vehicle, the battery mounting structure comprising:
   a mounting bush provided to penetrate a portion of a battery case and including a fastening screw formed on an upper inner circumferential surface of the mounting bush;
   a hollow bolt coupled to the battery case and the fastening screw from above the battery case;
   a fastening bolt provided to penetrate inside of the mounting bush and inside of the hollow bolt up and down; and
   a sleeve assembly provided inside the mounting bush and configured to guide the fastening bolt and elastically restrict separation of the fastening bolt from the mounting bush.

2. The battery mounting structure of claim 1, wherein an end portion of the fastening bolt penetrates the hollow bolt and a portion of a vehicle body to be coupled to a coupling nut so that the vehicle body is mounted between the hollow bolt and the coupling nut.

3. The battery mounting structure of claim 1, wherein the sleeve assembly is provided to elastically support the fastening bolt on the mounting bush while allowing the fastening bolt to be movable inside the mounting bush.

4. The battery mounting structure of claim 3, wherein the sleeve assembly includes:
   a coupling guide held in the mounting bush;
   a sleeve surrounding the fastening bolt and guiding the fastening bolt within the coupling guide; and
   a guide spring elastically mounted between the coupling guide and the sleeve.

5. The battery mounting structure of claim 4, wherein the coupling guide is detachably mounted by an elastic transformation of the mounting bush.

6. The battery mounting structure of claim 5,
   wherein the mounting bush is internally formed with a cylindrical space;
   wherein a coupling groove is formed on an internal circumferential surface of the mounting bush to hold the coupling guide below the fastening screw; and
   wherein a coupling protrusion is provided in an end portion of the coupling guide and elastically inserted in the coupling groove.

7. The battery mounting structure of claim 4, wherein the sleeve includes a plurality of holding protrusions to elastically press and support an external circumferential surface of the fastening bolt.

8. The battery mounting structure of claim 7,
   wherein the sleeve is cylindrically formed to surround the fastening bolt in the sleeve; and
   wherein the holding protrusions are provided in a plurality of elastic supporters protruding toward the fastening bolt from the sleeve.

9. The battery mounting structure of claim 4,
   wherein the guide spring includes a plurality of leaf springs connecting the coupling guide and the sleeve; and wherein a surface of the leaf springs is provided to be in parallel with a longitudinal direction of the sleeve.

10. The battery mounting structure of claim 9, wherein the plurality of leaf springs is provided between the coupling guide and the sleeve and forms a swirl shape around the sleeve.

11. The battery mounting structure of claim 4, wherein the guide spring includes a plurality of coil springs provided between the coupling guide and the sleeve.

12. The battery mounting structure of claim 1,
wherein the mounting bush is provided between an upper side of a mounting cup fastened to a lower case of the battery case and a lower side of an upper case of the battery case; and
wherein the hollow bolt is coupled to the fastening screw of the mounting bush with the upper case between the hollow bolt and the fastening screw.

13. The battery mounting structure of claim 12,
wherein the mounting cup includes a recessed portion formed upwards from a lower side of the lower case to accommodate a head portion of the fastening bolt in the recessed portion; and
wherein the mounting bush is provided on an upper side of the recessed portion.

14. A battery mounting method of a vehicle, the battery mounting method comprising:
inserting and fastening a sleeve assembly in and to an internal side of a mounting bush coupled to a battery case;
fastening a hollow bolt to an upper side of the mounting bush with an upper case of the battery case compressed and held between the hollow bolt and the mounting bush; and
fastening a fastening bolt penetrating the mounting bush to a coupling nut of a vehicle body positioned above a battery.

15. The battery mounting method of claim 14, wherein the sleeve assembly includes:
a coupling guide held in the mounting bush;
a sleeve surrounding the fastening bolt and guiding the fastening bolt within the coupling guide; and
a guide spring elastically mounted between the coupling guide and the sleeve.

16. The battery mounting method of claim 14, wherein when the battery is separated from the vehicle body, the fastening bolt is rotated to be separated from the coupling nut so that the fastening bolt is maintained as elastically supported on the sleeve assembly.

17. The battery mounting method of claim 16, wherein when the battery is coupled to the vehicle body again, the fastening bolt maintained by a sleeve of the sleeve assembly not to separate from the mounting bush is directly coupled to the coupling nut of the vehicle body.

* * * * *